US010944970B2

(12) United States Patent
 Mao

(10) Patent No.: US 10,944,970 B2
(45) Date of Patent: Mar. 9, 2021

(54) VIDEO CODING METHOD, COMPUTER DEVICE, AND STORAGE MEDIUM

(71) Applicant: Tencent Technology (Shenzhen) Company Limited, Shenzhen (CN)

(72) Inventor: Xunan Mao, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 0 days.

(21) Appl. No.: 16/450,705

(22) Filed: Jun. 24, 2019

(65) Prior Publication Data

US 2019/0320175 A1    Oct. 17, 2019

Related U.S. Application Data

(63) Continuation of application No. PCT/CN2018/092688, filed on Jun. 25, 2018.

(30) Foreign Application Priority Data

Nov. 21, 2017  (CN) .......................... 201711166195.7

(51) Int. Cl.
*H04N 19/126* (2014.01)
*H04N 19/577* (2014.01)
(Continued)

(52) U.S. Cl.
CPC ......... *H04N 19/126* (2014.11); *H04N 19/114* (2014.11); *H04N 19/573* (2014.11); *H04N 19/577* (2014.11)

(58) Field of Classification Search
CPC .. H04N 19/105; H04N 19/172; H04N 19/152; H04N 19/124; H04N 19/126; H04N 19/114; H04N 19/573; H04N 19/577
(Continued)

(56) References Cited

U.S. PATENT DOCUMENTS

2008/0304562 A1* 12/2008 Chang .................. H04N 19/124
                                                   375/240.03
2013/0177075 A1*  7/2013 Zheng .................. H04N 19/105
                                                   375/240.03
(Continued)

FOREIGN PATENT DOCUMENTS

CN     102577379 A     7/2012
CN     102714725 A    10/2012
CN     104871539 A     8/2015
CN     104954793 A     9/2015
(Continued)

OTHER PUBLICATIONS

Written Opinion and International Search Report dated Aug. 31, 2018 in PCT/CN2018/092688 with concise English translation.
(Continued)

*Primary Examiner* — Albert Kir
(74) *Attorney, Agent, or Firm* — Oblon, McClelland, Maier & Neustadt, L.L.P.

(57) ABSTRACT

A video coding method can include receiving, by processing circuitry of a coding device, a current picture in a group of pictures (GOP) of a layered coding structure in video sequence. The current picture can have two reference pictures. A current layer of the current picture in the layered coding structure can be determined. A current quantization parameter (QP) offset of the current picture can be determined according to the current layer of the current picture. Reference QPs corresponding to the two reference pictures of the current picture can be determined. A current QP of the current picture can be determined according to the reference QPs and the current QP offset. The current picture can be coded according to the current QP.

20 Claims, 11 Drawing Sheets

(51) Int. Cl.
*H04N 19/114* (2014.01)
*H04N 19/573* (2014.01)

(58) Field of Classification Search
USPC ..................................... 375/240.03; 382/166
See application file for complete search history.

(56) References Cited

U.S. PATENT DOCUMENTS

2014/0247983 A1* 9/2014 MacInnis ............. H04N 19/152
382/166
2015/0319437 A1* 11/2015 Zhang .................. H04N 19/172
375/240.03

FOREIGN PATENT DOCUMENTS

GB 2499874 A * 9/2013 ............. H04N 19/61
GB 2499874 A 9/2013

OTHER PUBLICATIONS

Japanese Office Action dated Dec. 22, 2020 in Japanese Application No. 2019-563158, 6 pgs.

H. Schwarz, et al, Hierarchical B pictures, Joint Video Team (JVT) of ISO/IEC MPEG & ITU-T VCEG (ISO/IEC JTC1/SC29/WG11 and ITU-T SG16 Q.6), 16$^{th}$ Meeting: Poznan, PL, Jul. 23-29, 2005, Document: JVT-P014, 33 pgs.

Junjun Si, et al, Adaptive rate control for HEVC, Joint Collaborative Video Team on Video Coding (JCT-VC) of ITU-T SG 16 WP 3 and ISO/IEC JTC 1/SC 29/WG 11, 10 Meeting: Stockholm, SE, Jul. 11-20, 2012, Document JCTVC-J0057, 12 pgs.

C Rosewarne, et al, High Efficiency Video Coding (HEVC) Test Model 16 (HM 16) Improved Encoder Description Update 9, Joint Collaborative Team on Video Coding (JCT-VC) of ITU-T SG16 WP3 and ISO/IEC JTC1/SC29/WG11, 28$^{th}$ Meeting: Torino. IT, Jul. 15-21, 2017, Document JCTVC-AB1002, 6 pgs.

Sebastien Lasserre, et al, Description of the scalable video coding technology proposal by Canon Research Centre France, Joint Collaborative Team on Video Coding (JCT-VC) of ITU-T SG16 WP3 and ISO/IEC JTC1/SC29/WG11, 11$^{th}$ Meeting: Shanghai, CN, Oct. 10-19, 2012, Document: JCTVC-K0041, 10 pgs.

Xiang Li, et al, Adaptive Quantization Parameter Cascading for Hierarchical Video Coding, 7 pgs.

* cited by examiner

Timeline

VIDEO CODING METHOD, COMPUTER DEVICE, AND STORAGE MEDIUM

RELATED APPLICATION

This application is a continuation of International Application No. PCT/CN2018/092688, filed on Jun. 25, 2018, which claims priority to Chinese Patent Application No. 201711166195.7, filed on Nov. 21, 2017. The entire disclosures of the prior applications are hereby incorporated by reference in their entirety.

FIELD OF THE TECHNOLOGY

This application relates to the field of video coding.

BACKGROUND OF THE DISCLOSURE

With the rapid development and wide application of multimedia technologies and network technologies, a large amount of video information is used in people's daily life and production activities. Video coding techniques can be employed to compress the transmitted or stored video data.

During video compression, a quantization parameter (QP) of a picture can be adjusted to control a bit rate of the picture, such that a stable bit rate and a lower video delay can be ensured over a limited video transmission bandwidth. Currently, a QP of a current picture frame needs to be calculated according to a preconfigured bit rate control model, which can lead to high complexity and low video coding efficiency.

SUMMARY

A video coding method can include receiving, by processing circuitry of a coding device, a current picture in a group of pictures (GOP) of a layered coding structure in video sequence. The current picture can have two reference pictures. A current layer of the current picture in the layered coding structure can be determined. A current quantization parameter (QP) offset of the current picture can be determined according to the current layer of the current picture. Reference QPs corresponding to the two reference pictures of the current picture can be determined. A current QP of the current picture can be determined according to the reference QPs and the current QP offset. The current picture can be coded according to the current QP.

An apparatus of video coding can include comprising circuitry that is configured to receive a current picture in a group of pictures (GOP) of a layered coding structure in video sequence. The current picture can have two reference pictures. A current layer of the current picture in the layered coding structure can be determined. A current quantization parameter (QP) offset of the current picture can be determined according to the current layer of the current picture. Reference QPs corresponding to the two reference pictures of the current picture can be determined. A current QP of the current picture can be determined according to the reference QPs and the current QP offset. The current picture can be coded according to the current QP.

A non-transitory computer readable medium can store a program that is executable by a processor to perform the video coding method.

BRIEF DESCRIPTION OF THE DRAWINGS

To describe the technical solutions in the embodiments of this application more clearly, the following briefly describes the accompanying drawings required for describing the embodiments. The accompanying drawings in the following description show merely some embodiments of this application, and a person of ordinary skill in the art may still derive other drawings from these accompanying drawings.

DESCRIPTION OF EMBODIMENTS

To make the objectives, technical solutions, and advantages of this application clearer and more comprehensible, the following further describes this application in detail with reference to the accompanying drawings and embodiments. It is noted that the specific embodiments described herein are merely used for explaining this application but are not intended to limit this application.

It may be understood that the terms "first", "second" and the like used in this application may be used for describing various elements in this specification. However, the elements are not limited by the terms unless otherwise specified. The terms are used for distinguishing one element from another element.

Figure 1A:
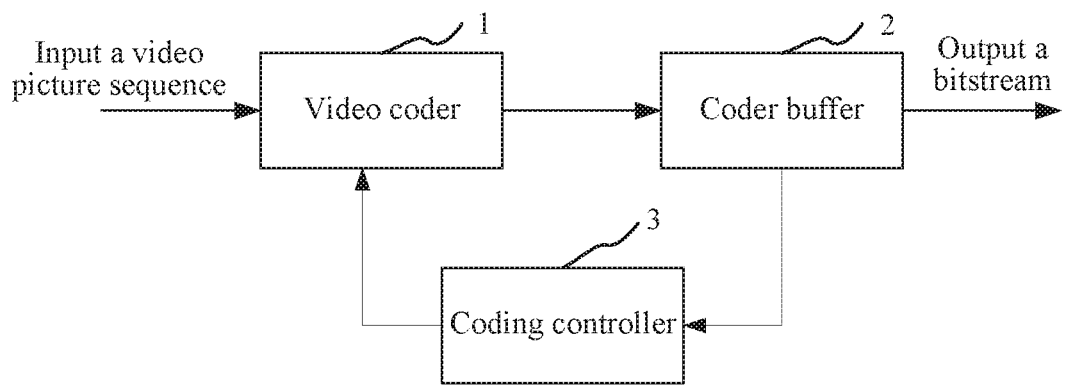
FIG. 1A is a diagram of a video coding system according to an embodiment.

FIG. 1A is a diagram of an application environment of a video coding method according to an embodiment. When video coding is performed, because the content of frames (also referred to as pictures) of a video are different, complexity of each frame is different. Therefore, a quantity of bits during coding of the frames of the video can constantly vary. In addition, a transmission channel bandwidth for transmitting the video can also keep changing. Therefore, a coder buffer needs to be set to balance a coding bit rate and bandwidth. As shown in FIG. 1, when video coding needs to be performed, a video sequence is input to a video coder 1, a bitstream obtained after the sequence is coded by the video coder 1 is input to a coder buffer 2 for buffering and then transmitted by a network. A bit rate controller 3 (also referred to as a coding controller) adjusts a quantization parameter (QP) of the video coder according to a set bit rate control model, to control the video coder to perform video coding to obtain a bit rate, thereby preventing overflow of the coder buffer 2.

The video coding method in this embodiment of this application may be applied to a computer device. The computer device may be an independent physical server or terminal, may be a server cluster including a plurality of physical servers, or may be a cloud server providing basic cloud computing services such as a cloud server, a cloud database, cloud storage and a content delivery network (CDN). The terminal may be a smartphone, a tablet computer, a notebook computer, a desktop computer, a smart speaker, a smartwatch, or the like, but is not limited thereto.

Figure 1B:
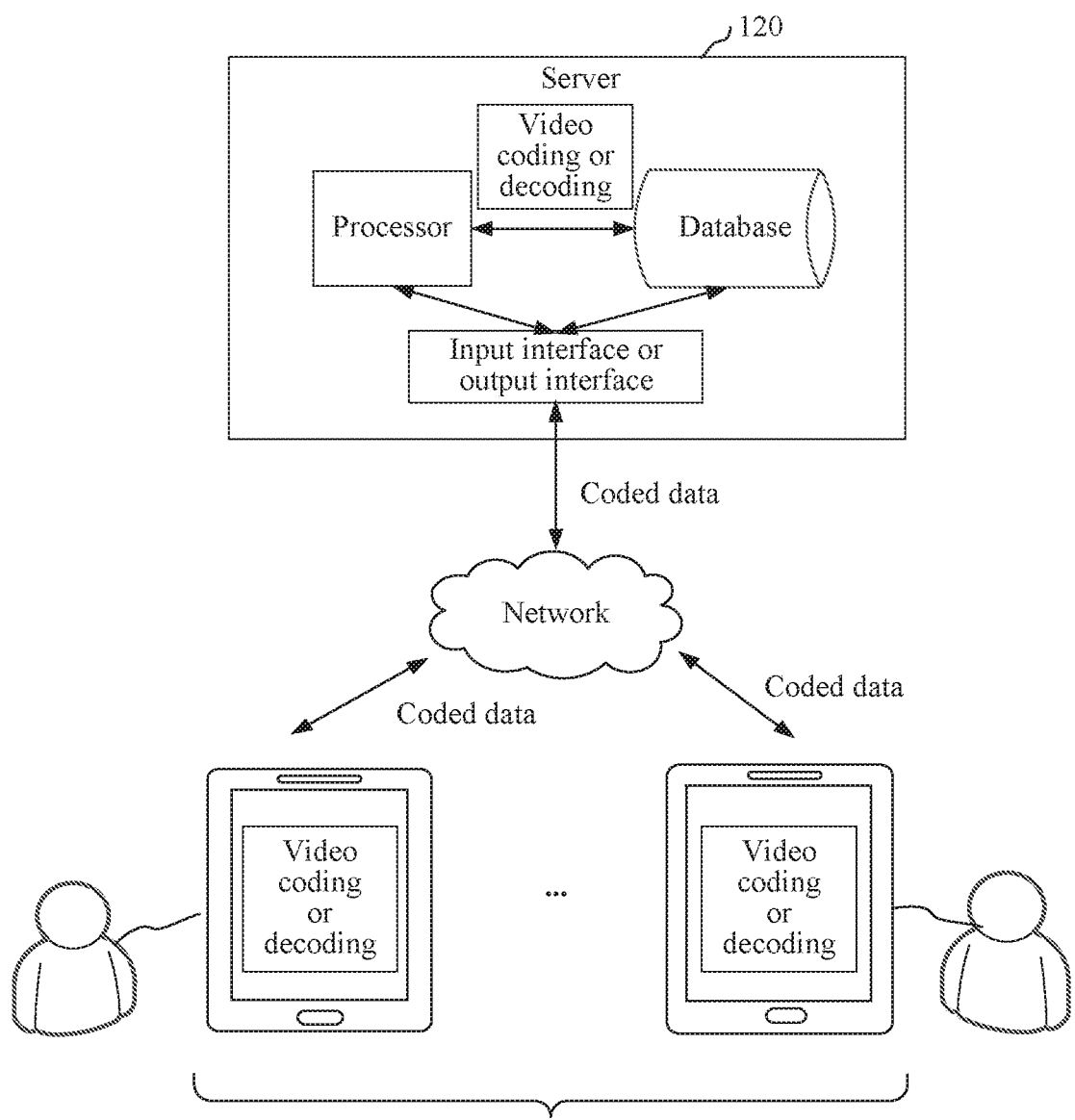
FIG. 1B is a diagram of an application environment of a video coding method according to an embodiment.

As shown in FIG. 1B, a terminal 110 or a server 120 may perform video coding by using a coder or video decoding by using a decoder. The terminal 110 or the server 120 may also perform video coding by using a processor running a video coding program or video decoding by using a processor running a video decoding program. After receiving, through an input interface, coded data sent by the terminal 110, the server 120 may transfer the coded data to the processor for decoding, or may store the coded data in a database for subsequent decoding. After obtaining coded data by using the processor coding a picture frame, the server 120 may send the coded data to the terminal 110 through an output interface, or may store the coded data in a database for subsequent transfer. The coded data is data obtained by coding a picture frame.

Figure 2A:
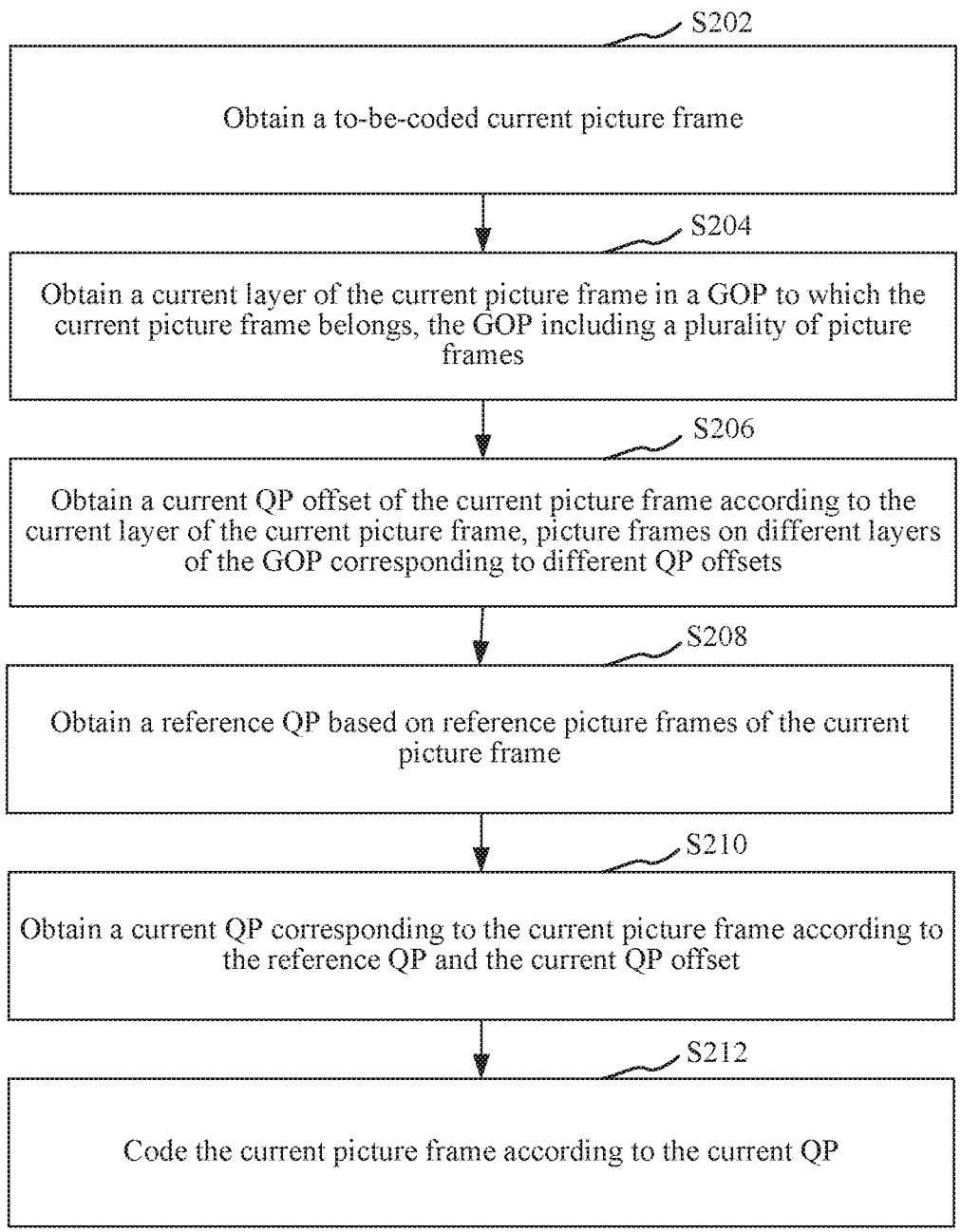
FIG. 2A is a flowchart of a video coding method according to an embodiment.

As shown in FIG. 2A, in an embodiment, a video coding method is provided. The method can be applied to the foregoing computer device. The method may specifically include the following steps:

Step S202: Obtain a to-be-coded current picture frame.

For example, a video includes a sequence of pictures each considered as one separate frame. The current picture frame is a picture frame that currently needs to be coded. When the video needs to be coded, the video sequence is input to a video coder, and the video coder obtains, according to a preset sequence, a to-be-coded picture frame for coding.

Step S204: Obtain a current layer of the current picture frame in a group of pictures (GOP) to which the current picture frame belongs. The GOP can include a plurality of picture frames.

For example, the GOP is a group of successive pictures, and several successive pictures in the video sequence may form a group, to facilitate random access and edition. A quantity of picture frames in one GOP may be specifically set according to an actual configuration, for example eight picture frames. The GOP may include three types of frames, namely, I frame, P frame, and B frame. The I frame is an intra-frame predicted frame (i.e. intra-predicted frame). The P frame is a unidirectionally predicted frame, and may be predicted through inter-frame prediction. The B frame is a bidirectionally predicted frame, and may be predicted by referring to two reference frames, such as a preceding or a following picture frame.

The current layer is a layer of the current picture frame in the GOP. A layered coding structure may be preset, and accordingly a layer of a picture frame in the GOP can be obtained according to the layered coding structure. The layered coding structure refers to picture frames in the GOP being divided into a plurality of layers for coding, and different layers may correspond to different coding qualities or compression rates. A specific layering method may be set according to an actual configuration or application scenario. For example, the picture frames in the GOP are layered chronologically, to obtain a time-based B-frame layered coding structure (hierarchical B structure). The layered coding structure sets a quantity of layers, a picture frame corresponding to each layer and a reference relationship between picture frames.

A lower layer picture frame may serve as a reference for coding of a higher layer picture frame. Therefore, during coding, more error correction protection or transmission priorities may be provided to a lower layer picture frame, to dynamically adapt to a network bandwidth change or improve coding efficiency. In the layered coding structure, the quantity of layers may be specifically set according to an actual configuration. For example, the GOP may be divided into two layers, three layers, or four layers. After the layered coding structure is determined, a coding sequence of the picture frames in the GOP is obtained according to the layered coding structure, and the picture frames in the GOP are coded, to obtain the current picture frame. Then, the current layer corresponding to the current picture frame may be obtained according to the layered coding structure.

Figure 2B:
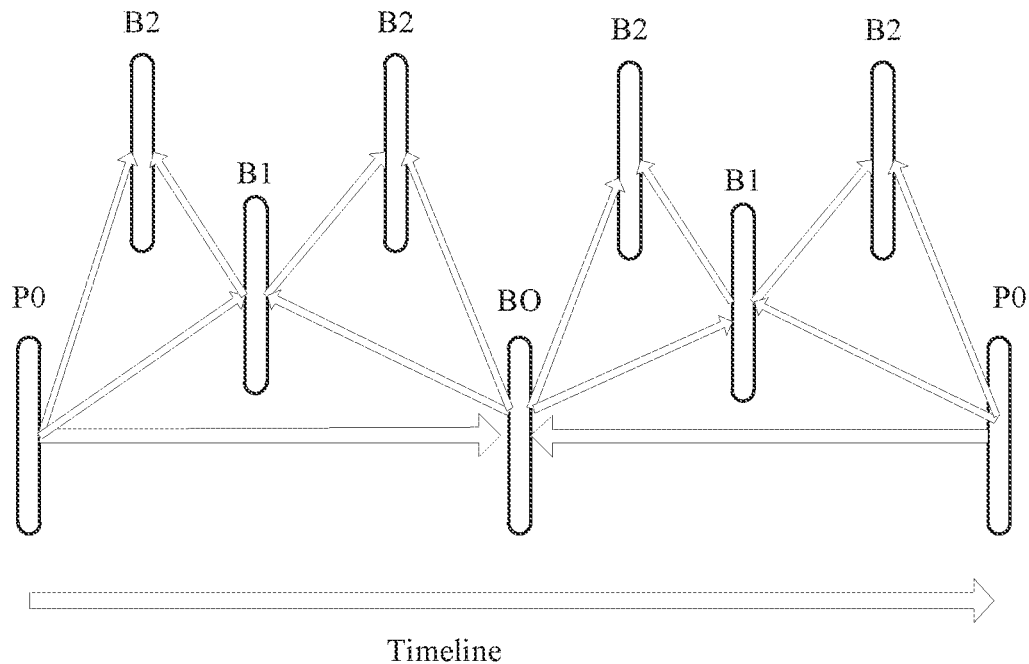
FIG. 2B is a schematic diagram of a time-based B-frame layered coding structure according to an embodiment.

An example is shown in FIG. 2B in which the preset layered coding structure is the time-based B-frame layered coding structure. As shown, a GOP includes eight picture frames. B frames in the GOP are divided into three layers, namely, a B0 layer, a B1 layer, and a B2 layer. The B0 layer includes the fourth B frame, the B1 layer includes the second and the sixth B frames, and the B2 layer includes the remaining B-frame picture frames. A start point of an arrow represents a reference frame picture, an end point of the arrow indicates a picture frame coded according to the reference frame, and the picture frames are sorted according to a display sequence of the picture frames. In a layered coding structure, a lower layer picture frame may serve as a reference for coding of a higher layer picture frame. For example, reference frames of the picture frame on the B0 layer are P0 frames at the left and right sides. The picture frames on the B1 layer may serve as a reference for coding of the picture frames on the B2 layer. It may be understood that, the time-based B-frame layered coding structure is not limited to the three-layer coding structure, but may be, for example, a two-layer coding structure or a four-layer coding structure.

Step S206: Obtain a current QP offset of the current picture frame according to the current layer of the current picture frame. The picture frames on different layers of the GOP may have different QP offsets.

For example, after a prediction residual obtained after prediction is performed on the picture frame is transformed, a quantization needs to be performed to reduce a quantity of data. During the quantization, a coefficient obtained after a discrete cosine transform (DCT) is performed on the prediction residual is mapped to a relatively small value. For example, a relatively small value may be obtained by dividing the coefficient by a quantization step. A QP is a sequence number of a quantization step, and a corresponding quantization step may be determined according to a QP. For example, a smaller QP indicates reservation of more details of a picture frame and a higher corresponding bit rate. A greater QP indicates a lower corresponding bit rate, greater distortion and lower quality of a picture. That is, the QP has a negative correlation with the bit rate.

During coding, a basic method for controlling a bit rate corresponding to a picture is adjusting a QP. A QP offset is a QP offset value of a coded picture frame relative to a reference frame of the picture frame. Picture frames on different layers of a GOP correspond to different QP offsets, and the QP offsets corresponding to the picture frames on the different layers may be preset, and may be specifically set according to an actual configuration. For example, QP offsets of the first layer to the third layer may be respectively 0.42, 0.8, and 1.2. In the layered coding structure, because a lower layer picture frame may serve as a reference for coding of a higher layer picture frame, occasions that a higher layer picture frame serves as a reference are relatively fewer, while occasions that a lower layer picture frame serves as a reference are relatively higher. Therefore, it may be set that a QP offset corresponding to a higher layer is greater than a QP offset corresponding to a lower layer. That is, a layer level of a picture frame has a positive correlation with a QP offset, to improve compression efficiency of video coding.

Step S208: Obtain a reference QP based on reference picture frames of the current picture frame.

For example, reference frames are used for performing prediction on the coded picture frame. A selection method of the reference frame may be set according to an actual configuration. A reference picture frame can be a reference frame selected from a list of candidate reference frames of the current picture frame. The reference frame may be selected, for example, based on a spatial similarity and the like. In an embodiment, the current picture frame is a B frame that is bidirectionally predicted. The B frame has two sequences of candidate reference frames (e.g., two reference picture lists), and a picture frame of each of the two sequences of candidate reference frames may be selected as a reference picture frame. Based on the two reference picture frames, the reference QP can be determined.

In an embodiment, the reference QP may be a coding QP for coding one of the two reference picture frame. In an embodiment, the reference QP may be obtained based on the coding QP and the QP offset that correspond to one of the two reference picture frames. For example, the reference QP is obtained by subtracting the QP offset corresponding to the reference picture frame from the coding QP corresponding to the reference picture frame. In an embodiment, if the reference picture frame has a plurality of coding QPs, for example, each coding unit corresponds to a QP, the reference QP may be an average value of the QPs in the reference picture frame. In other embodiments, the reference QP may be obtained based on the coding QPs of the two reference picture frames, or based on the coding QPs and the OP offsets of the two reference picture frames.

Step S210: Obtain a current QP corresponding to the current picture frame according to the reference QP and the current QP offset.

For example, a current QP corresponding to the current picture frame is obtained according to the reference QP and the current QP offset. In an embodiment, the current QP may be a sum of the reference QP and the current QP offset.

In an embodiment, when the current picture frame is a bidirectional predicted frame, because there are two reference picture frames, the current QP may also be obtained according to a frame distance between each of the reference picture frames and the current picture frame. For example, a weight corresponding to the frame distance is set for each of the two reference picture frames. A weighted-sum value corresponding to the two reference picture frames is obtained according to the weights corresponding to the two reference picture frames and the coding QPs of the two reference picture frames. Then, the current QP is obtained according to the weighted-sum value and the current QP offset.

Step S212: Code the current picture frame according to the current QP.

For example, a correspondence is preset between a QP and a quantization step. Therefore, a corresponding quantization step may be obtained according to the current QP, and quantization coding is performed on the current picture frame according to the quantization step. For example, generally, a principle of quantization is expressed by using the following formula: FQ=round(y/Qstep) where y is a value (e.g., a coefficients resulting from a DCT transform) corresponding to a picture frame before quantization is performed, Qstep is a quantization step, and FQ is a quantized value of y. The Round(x) function is used for performing rounding off to an even number on the quantized value.

The correspondence between the QP and the quantization step may be specifically set according to a configuration. For example, in a current video coding standard, for brightness coding, the quantization step has 52 values that are integers from 0 to 51. For chroma coding, the quantization step has values that are integers from 0 to 39. In addition, the quantization step increases as the QP increases. Each time the QP is increased by 6, the quantization step is doubled. It may be understood that, when all the QPs in the correspondence between the QP and the quantization step are integers, rounding may be performed on the current QP obtained at step S210. A rounding method may be performed to round off to an integer.

The video coding method may be used to compress a video file, for example, compressing a WeChat short-form video. When the current picture frame needs to be coded, the current layer of the current picture frame in the GOP to which the current picture frame belongs is obtained, and then the QP offset corresponding to the current picture frame is obtained according to the current layer. The reference QP corresponding to the reference picture frame of the current picture frame is obtained, and the current QP corresponding to the current picture frame is obtained according to the reference QP and the QP offset. The current picture frame is coded according to the current QP. Because the current QP corresponding to the current picture frame is obtained by using the QP offset corresponding to the current layer of the to-be-coded current picture frame and the coding QP corresponding to the reference picture frame, the calculation complexity is lowered. In addition, the QP offset can be flexibly configured for picture frames on different layers, so that coding efficiency can be improved.

Figure 3:
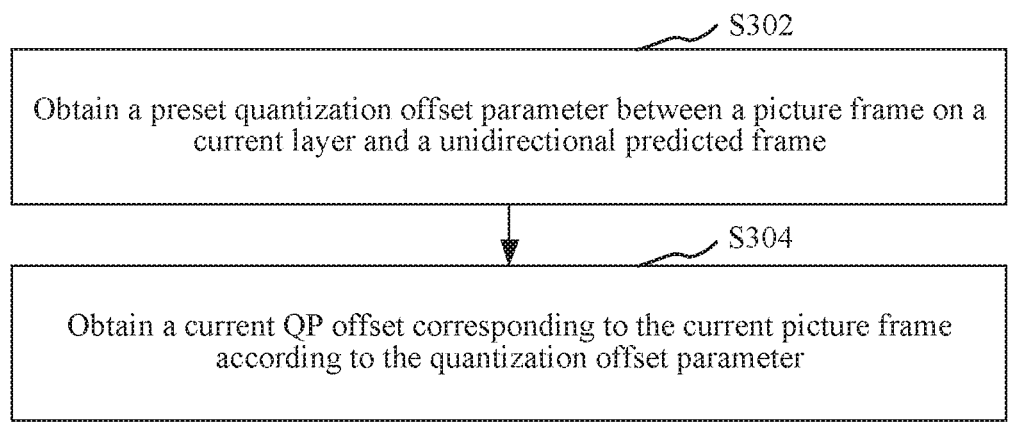
FIG. 3 is a flowchart of obtaining a current QP offset corresponding to a current picture frame according to a current layer in an embodiment.

In an embodiment, as shown in FIG. 3, the current picture frame is a bidirectionally predicted frame, and the step of obtaining a current QP offset corresponding to the current picture frame according to the current layer includes:

Step S302: Obtain a preset quantization offset parameter between the picture frame on the current layer and a unidirectional predicted frame.

For example, quantization offset parameters of different layers of each layered coding structure with respect to the unidirectional predicted frame may be preconfigured. The QP offset can be calculated according to the quantization offset parameter, and the QP offset has a positive correlation with the quantization offset parameter. A formula of obtaining a quantization offset based on a quantization offset parameter may be obtained according to the correspondence between the quantization step and the QP. For example, for the current brightness coding, the quantization step has 52 values in total that are integers from 0 to 51, and the QP has a correlation with the quantization step. The QP increases as the quantization step increases. Each time the QP is increased by 6, the quantization step is doubled. Accordingly, the QP offset is a product between 6 and a logarithm of a quantization offset parameter with 2 as the base. This is expressed by using the following formula: pbOffset_i=6*log$_2$(pbFactor_i). PbOffset_i represents a QP offset corresponding to an i$^{th}$ layer, and PbFactor_i represents a quantization offset parameter corresponding to the i$^{th}$ layer. A specific value of the quantization offset parameter may be preset according to a configuration or experience.

Because occasions that a higher layer picture frame serves as a reference is a fewer, a layer level of a picture frame has a positive correlation with a QP offset. A QP corresponding to the high layer picture frame is greater, and a bit rate is lower. In an embodiment, because a layer on which the unidirectional predicted frame is located is lower than a layer on which the bidirectionally predicted frame is located in layered coding structure, the unidirectional predicted frame may serve as a reference to set quantization offset parameters between picture frames on different layers of the bidirectionally predicted frame and the unidirectional predicted frame. A QP corresponding to the lower layer unidirectional predicted frame is smaller than a QP corresponding to the high layer bidirectionally predicted frame, so that coding efficiency can be improved. Therefore, the quantization offset parameter is greater than 1. In an embodiment, quantization offset parameters corresponding to the B0 layer, the B1 layer and the B2 layer may be respectively 1.05, 1.10, and 1.15.

Step S304: Obtain the current QP offset corresponding to the current picture frame according to the quantization offset parameter.

For example, after the quantization offset parameter is obtained, the current QP offset corresponding to the current picture frame may be obtained according to the obtained quantization offset parameter and a corresponding calculation formula. As described, a specific calculation formula may be obtained according to the correspondence between the quantization step and the QP.

Figure 4:
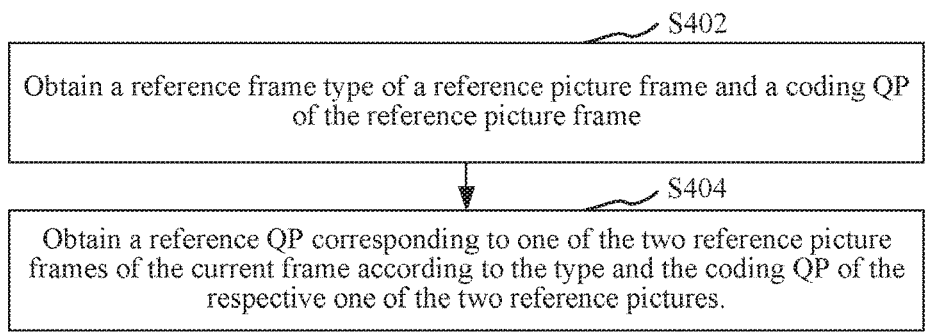
FIG. 4 is a flowchart of obtaining a reference QP corresponding to a reference picture frame of a current picture frame according to an embodiment.

In an embodiment, as shown in FIG. 4, step S208 of obtaining a reference QP based on reference picture frames of the current picture frame includes:

Step S402: Obtain a reference frame type of the reference picture frame and a coding QP of the reference picture frame.

For example, the reference frame type may include I-frame, B-frame and P-frame. A reference frame type may be specifically set according to a configuration or different video coding standards. For example, in some video coding standards such as H26.3, a B frame cannot be used as a reference frame. In some video coding standards, however, a B frame can be used as a reference frame. The coding QP of the reference picture frame is a QP used for coding the reference picture frame.

Step S404: Obtain the reference QP corresponding to one of the two reference picture frames of the current frame according to the type and the coding QP of the respective one of the two reference picture frames.

For example, the coding QP corresponding to the reference picture frame (that is one of the two reference picture frames) may be adjusted according to different reference frame types to obtain the reference QP. For example, for an I frame and a P frame, the coding QP corresponding to the reference picture frame may be used as the reference QP. For a B frame, because B frames have a plurality of layers, and QP offsets corresponding to different layers are different, the reference QP may be obtained with reference to the QP offset and the coding QP of the B frame. For example, when the reference picture frame is a B frame, the reference QP is obtained by subtracting the QP offset corresponding to the reference picture frame from the coding QP corresponding to the reference picture frame.

In an embodiment, when the current picture frame is a B frame, the method for obtaining the current QP according to the reference QP of the reference picture frame and the current QP offset may be used. However, when the current picture frame is an I frame and a P frame, the current QP of current picture frame can be determined according to a bit rate control model. For example, when the current picture frame is a P frame, the current QP corresponding to the current picture frame can be calculated according to a bit rate control model to control the bit rate and prevent an error of the bit rate from being excessively great. The bit rate control model may be a reference mode 8 (RM8), a verification mode 8 (VM8), and the like, and is not specifically limited.

When the current picture frame is an I frame, for example, the current QP corresponding to the current picture frame may be calculated by using the bit rate control model. Alternatively, a QP offset of a P frame relative to an I frame may be set, and then the current QP corresponding to the current picture frame is obtained according to a QP corresponding to the P frame and the QP offset of a P frame relative to an I frame. In an embodiment, a QP corresponding to the I frame is obtained by subtracting the QP offset of a P frame relative to an I frame from a coding QP corresponding to the P frame. In other words, the QP corresponding to the I frame is less than the QP corresponding to the P frame, so that coding precision corresponding to the I frame is higher and picture distortion is smaller. A coding QP corresponding to a nearest P frame of the I frame may be selected to subtract the QP offset of a P frame relative to an I frame.

In an embodiment, the current picture frame is a bidirectionally predicted frame, and the step of obtaining the reference QP corresponding to the reference picture frame according to the reference frame type and the coding QP includes: when the reference frame type is a bidirectionally predicted frame, obtaining a layer of the reference picture frame in a GOP to which the reference picture frame belongs; obtaining a reference QP offset corresponding to the reference picture frame according to the layer of the reference picture frame in the GOP to which the reference picture frame belongs; and obtaining the reference QP corresponding to the reference picture frame according to the coding QP and the reference QP offset corresponding to the reference picture frame.

For example, the reference QP offset is a QP offset corresponding to the layer on which the reference picture frame is located. For example, when the reference picture frame is a bidirectionally predicted frame, the coding QP corresponding to the reference picture frame can be obtained by using a QP offset corresponding to the layer on which the reference picture frame is located and a reference QP corresponding to the reference picture frame. Therefore, when the reference picture frame is a bidirectionally predicted frame, the layer of the reference picture frame in the GOP to which the reference picture frame belongs can be obtained, and the reference QP offset corresponding to the reference picture frame can be obtained according to the layer of the reference picture frame in the GOP to which the reference picture frame belongs. Then, the reference QP corresponding to the reference picture frame can be obtained according to the coding QP of the reference picture frame and the reference QP offset corresponding to the reference picture frame. For example, the reference QP is a difference between the coding QP and the reference QP offset. This may be specifically set according to a configuration.

Figure 5:
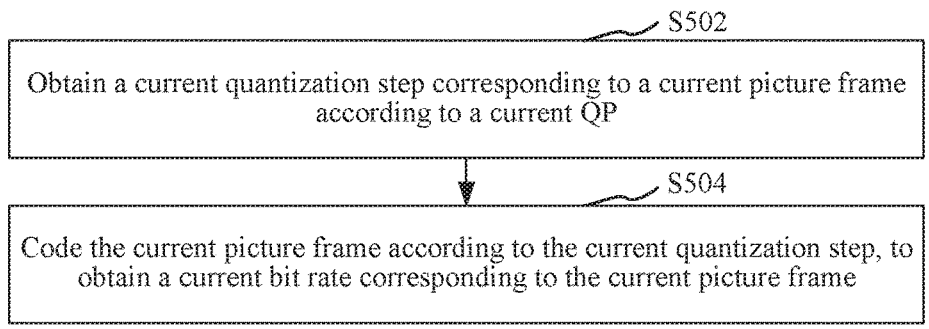
FIG. 5 is a flowchart of coding a current picture frame according to a current QP in an embodiment.

In an embodiment, as shown in FIG. 5, the step of coding the current picture frame according to the current QP includes:

Step S502: Obtain a current quantization step corresponding to the current picture frame according to the current QP of the current picture frame.

For example, after the current QP is obtained, a quantization step corresponding to the current QP is obtained according to the correspondence between the QP and the quantization step and is used as the current quantization step.

Step S504: Code the current picture frame according to the current quantization step, to obtain a current bit rate corresponding to the current picture frame.

For example, the bit rate is a quantity of data bits sent in a unit of time. The current bit rate is a corresponding bit rate after the current picture frame is coded according to the current quantization step. A bit rate unit may be a quantity of bits transmitted per second, and a higher bit rate indicates a higher data transferring speed. The corresponding current bit rate is obtained after the current picture frame is coded according to the current quantization step.

Figure 6:
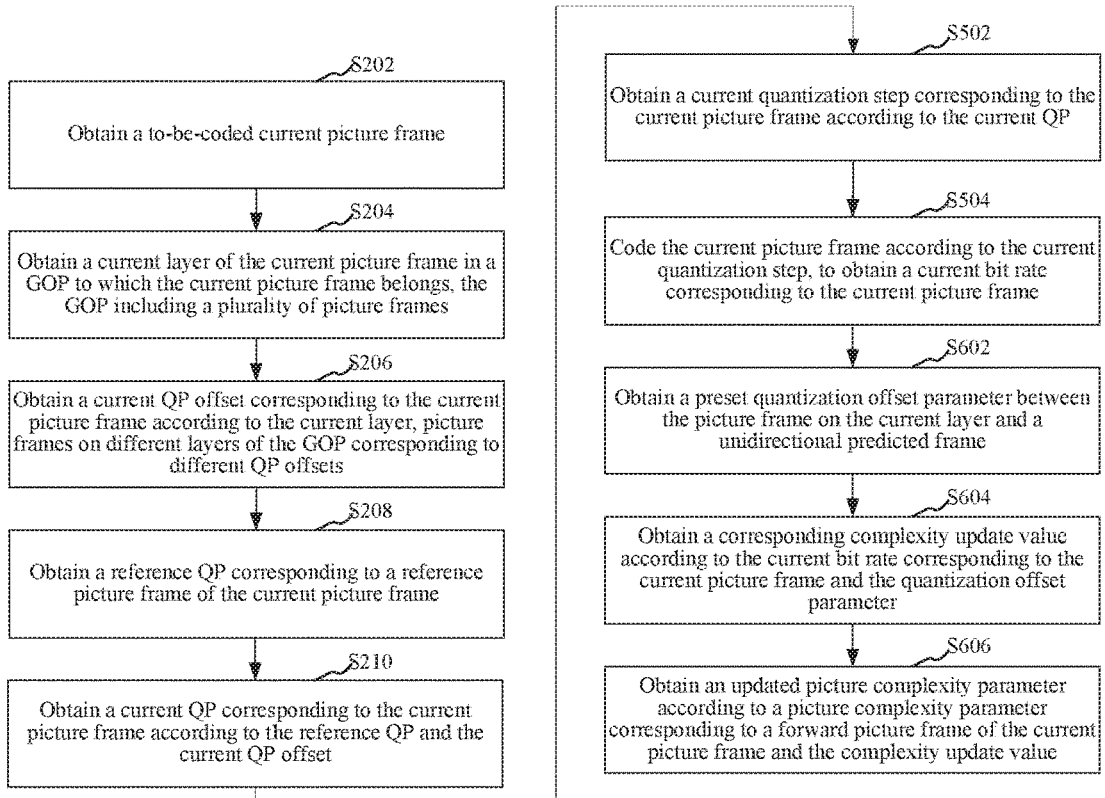
FIG. 6 is a flowchart of a video coding method according to an embodiment.

In an embodiment, the current picture frame is a bidirectionally predicted frame. As shown in FIG. 6, the video coding method further includes the following the steps in addition to the steps described above:

Step S602: Obtain a preset quantization offset parameter between the picture frame on the current layer and a unidirectional predicted frame.

For example, because the QP offset is calculated according to the quantization offset parameter, and the current QP of the current picture frame is obtained according to the current QP offset of the current picture frame, a bit rate corresponding to the current picture frame may be corrected according to the quantization offset parameter to obtain a corrected bit rate in order to calculate a picture complexity parameter. This improves accuracy of the picture complexity parameter determination.

Step S604: Obtain a corresponding complexity update value according to the current bit rate corresponding to the current picture frame and the quantization offset parameter.

For example, the picture complexity parameter is used for representing complexity of a picture frame. The picture complexity parameter is a parameter in the bit rate control model, and is used for calculating a quantization step of the picture frame. A greater picture complexity parameter indicates more complex information such as image texture and a higher required transmission bit rate. The complexity update value is used for updating the picture complexity parameter, to dynamically update the picture complexity parameter.

Step S606: Obtain an updated picture complexity parameter according to a picture complexity parameter corresponding to a preceding picture frame (i.e., a prior picture frame in coding order) of the current picture frame and the complexity update value.

For example, the picture complexity parameter corresponding to the preceding picture frame is a picture complexity parameter obtained through updating after the preceding picture frame is coded. The preceding picture frame is a picture frame coded before the current picture frame. The preceding picture frame may be a preceding picture frame, so that a picture complexity parameter can be updated in time, or may certainly be another preceding picture frame, and may be specifically set according to a configuration. By updating the picture complexity parameter corresponding to the preceding picture frame by using the complexity update value to obtain the updated picture complexity parameter, the picture complexity parameter in the bit rate control model can be updated.

In an example, the complexity update value is Obtained according to the corrected bit rate and the current quantization step that corresponds to the current picture frame. The updated picture complexity parameter may be a sum of the picture complexity parameter of the preceding picture frame of the current picture frame and the complexity update value, and is expressed by using the following formula:

$$cplxsum_j = cplxsum_{j-1} + \text{Bit}_j * \text{pbFactor\_i} * \frac{\text{Scale}_j}{\text{pre\_param}_j},$$

where the current picture frame is a $j_{th}$ frame, a preceding frame is a $j-1_{th}$ frame, a complexity parameter determined when the $j-1_{th}$ picture frame is coded is $cplxsum_{j-1}$, $\text{Bit}_j$ is the bit rate corresponding to the $j_{th}$ frame (the current picture frame), and $\text{Scale}_j$ is the current quantization step corresponding to the $j_{th}$ frame. If the current picture frame is divided into a plurality of coding units, and each coding unit corresponds to a quantization step, $\text{Scale}_j$ may be an average quantization step corresponding to the current picture frame. pbFactor_i represents a quantization offset parameter between a bidirectionally predicted frame of an $i^{th}$ layer and a unidirectional predicted frame. pre_param$_j$ is a pre-analysis parameter of the $j_{th}$ frame, and may be a sum of absolute differences (SAD) corresponding to the $j^{th}$ frame. SAD is a sum of absolute differences between a predicted value and an actual value of the current picture frame.

Figure 7:
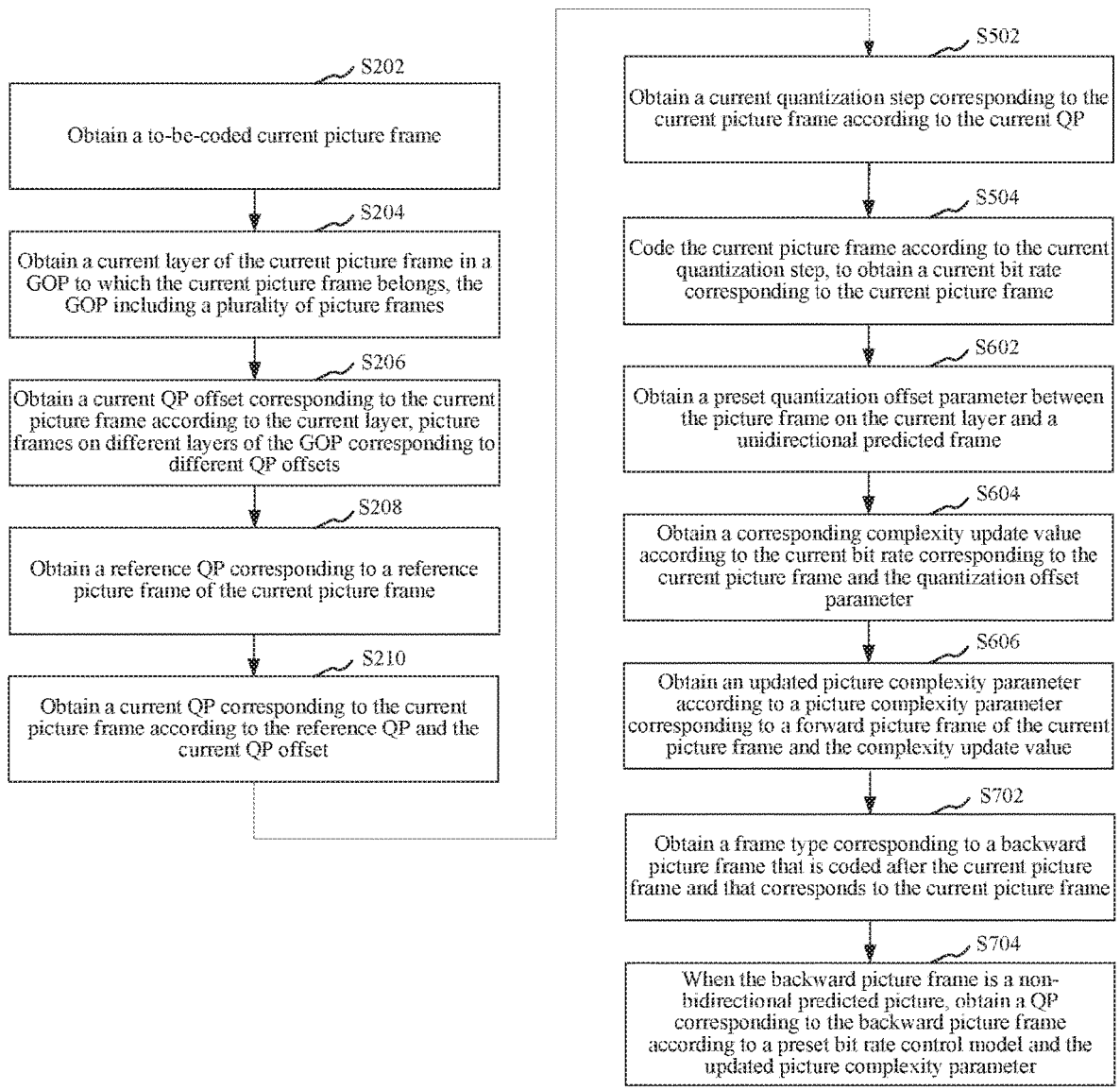
FIG. 7 is a flowchart of a video coding method according to an embodiment.

In an embodiment, as shown in FIG. 7, the video coding method further includes the following the steps in addition to the steps as described above:

Step S702: Obtain a frame type corresponding to a subsequent picture frame that is coded after the current picture frame and that corresponds to the current picture frame.

For example, the subsequent picture frame is a picture frame coded after the current picture frame. The subsequent picture frame may be a following picture frame, or may be another subsequent picture frame, and may be specifically set according to a configuration. The frame type may include I-frame, B-frame, and P-frame.

Step S704: When the subsequent picture frame is a non-bidirectionally predicted picture, obtain a QP corresponding to the subsequent picture frame according to a preset bit rate control model and the updated picture complexity parameter.

For example, the non-bidirectionally predicted frame can be a I frame or a P frame. In one example, it may be that the QP corresponding to the subsequent picture frame is obtained according to the preset bit rate control model and the updated picture complexity parameter only when the subsequent picture frame is a P frame. The picture complexity parameter in the bit rate control model is a model parameter of the bit rate control model. Therefore, the bit rate control model is updated by using the updated picture complexity parameter, and the QP corresponding to the subsequent picture frame is obtained according to the bit rate control model. The bit rate control model may be specifically set according to a configuration. For example, the bit rate control model may be a test mode 5 (TM5) algorithm. The QP of the subsequent picture frame is calculated by using the bit rate control model when the subsequent picture frame is a non-bidirectionally predicted frame, so that an error of a video bit rate is not excessively great as a quantity of picture frames increases.

Figure 8:
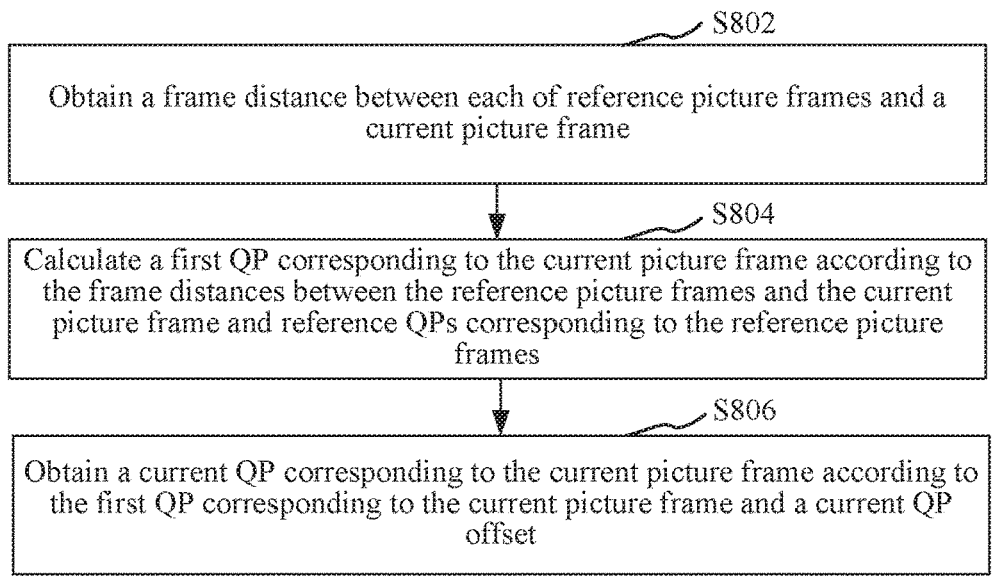
FIG. 8 is a flowchart of obtaining a current QP corresponding to a current picture frame according to a reference QP and a current QP offset according to an embodiment.

In an embodiment, the current picture frame has a plurality of reference picture frames. As shown in FIG. 8, step S210 of obtaining a current QP corresponding to the current picture frame according to the reference QP and the current QP offset includes:

Step S802: Obtain a frame distance between each of the reference picture frames and the current picture frame.

For example, the frame distance may be represented by using a quantity of frames between picture frames, or may be represented by using a difference of display time between picture frames. The quantity of frames between picture frames may be represented by using a difference of display orders between the picture frames. For example, if the reference picture frame is the second frame in the GOP, and the current picture frame is the sixth frame in the same GOP, the frame distance is 4. There may be two reference picture frames. For example, there are two reference picture frames for a B frame.

Step S804: Calculate a first QP corresponding to the current picture frame according to the frame distances between the reference picture frames and the current picture frame and reference QPs corresponding to the reference picture frames.

For example, a ratio coefficient corresponding to each frame distance may be set, and then the first QP corresponding to the picture frame is obtained according to the ratio coefficients and the corresponding reference QPs. In an embodiment, a weight corresponding to each current reference picture frame may be obtained according to a frame distance between the current reference picture frame and the current picture frame, and then the first QP corresponding to the current picture frame is obtained according to the weights and the reference QPs corresponding to the reference picture frames. The frame distance may have a negative correlation with the weight, so that a QP corresponding to a reference picture frame closer to the current picture frame has a greater impact on the QP of the current picture frame. In an embodiment, the weight may be a reciprocal of the frame distance.

For example, the current picture frame is a bidirectionally predicted frame having two reference picture frames. A distance between a first reference picture frame and the current picture frame is $n_1$ frames, and a reference QP of the first reference picture frame is $qp_1$. A distance between a second reference picture frame and the current picture frame is $n_2$ frames, and a reference QP of the second reference picture frame is $qp_2$. $n_1$ and $n_2$ are both positive integers. The first QP is a weighted average value of the reference QPs and weights of the two reference picture frames. The weight of a QP of the first reference picture frame is a ratio of the frame distance between the second reference picture frame and the current picture frame to a total frame distance. The weight of a QP of the second reference picture frame is a ratio of the frame distance between the first reference picture frame and the current picture frame to the total frame distance. That the first QP corresponding to the current picture frame is calculated according to the frame distances between the reference picture frames and the current picture frame and the reference QPs corresponding to the reference picture frames may be expressed by using the formula (I):

$$\frac{(qp_1 * n_2 + qp_2 * n_1)}{n_1 + n_2} \quad (1)$$

Step S806: Obtain the current P corresponding to the current picture frame according to the first QP corresponding to the current picture frame and the current QP offset.

For example, a current QP corresponding to the current picture frame is obtained according to the first QP and the current QP offset. In an embodiment, the current QP may be a sum of the first QP and the current QP offset.

In an embodiment, the current picture frame is a bidirectionally predicted frame having two reference picture frames. Step S210 of obtaining a current QP corresponding to the current picture frame according to the reference QP and the current QP offset further includes determining whether the reference picture frame is an I frame.

In an embodiment, if one of the reference picture frames is an I frame, and the other is a P frame, the steps S802 to S806 are not performed, and the current QP corresponding to the current picture frame is obtained according to a sum of a reference QP corresponding to the P-frame reference picture frame and the current QP offset.

In an embodiment, if one of the reference picture frames is an I frame, and the other is a B frame, the steps S802 to S806 are not performed, and the current QP corresponding to the current picture frame is obtained according to a sum of a reference QP corresponding to the B-frame reference picture frame and the current QP offset.

In an embodiment, if both of the reference picture frames are I frames, a second QP may be obtained according to coding QPs of the two reference picture frames, and then the current QP is obtained according to a sum of the second QP and a preset value. The second QP may be an average value of the coding QPs of the two reference picture frames. The preset value may be set according to an actual configuration. For example, the preset value may be a QP offset of a P frame relative to an I frame.

The video coding method provided in this embodiment is described below by using an example in which a layered coding structure is a time-based B-frame layered coding structure, a GOP includes eight picture frames in which the preceding seven picture frames are B frames and the last one is a P frame, and a reference relationship is shown in FIG. 2B.

1. According to the reference relationship in FIG. 2B, the reference picture frame of the current picture frame is coded before the current picture frame, and it can be determined that the last picture frame is coded first in the GOP. Because the current picture frame (the last picture frame) is a P frame, a QP of the last picture frame in the GOP is calculated according to a set bit rate control model and a target bit rate, and the picture frame is coded according to the calculated QP.

2. Obtain the fourth picture frame in the GOP. The fourth picture frame is a B frame and located on a B0 layer. Therefore, a QP offset corresponding to the B0 layer is obtained.

3. Obtain two reference picture frames of the fourth picture frame to obtain coding QPs and frame types that correspond to the two reference picture frames. If the reference picture frames are B frames, a QP offset corresponding to a layer on which each reference picture frame is located is obtained, and a difference between the coding QP and the QP offset corresponding to each reference picture frame is calculated, to obtain a reference QP corresponding to each reference picture frame. If the reference picture frame is an I frame or a P frame, the coding QP corresponding to the reference picture frame is used as the reference QP.

4. If one of the two reference picture frames of the fourth picture frame is an I frame and the other one is a non-I-frame, add a reference QP of the non-I-frame reference picture frame and the QP offset corresponding to the B0 layer, to obtain a coding QP corresponding to the fourth picture frame that is the current QP. If both of two reference frames of the fourth picture frame are I frames, calculate an average value of reference QPs corresponding to the two reference picture frames, add the average value and the set QP offset of a P frame relative to an I frame, and further add the QP offset corresponding to the B0 layer, to obtain the coding QP corresponding to the fourth picture frame.

If neither of the two reference frames of the fourth picture frame is an I frame, a frame distance between each of the two reference picture frames and the fourth picture frame can be obtained. A weight corresponding to each of the reference picture frames according to the frame distance can be calculated A weighted average value according to the weights and reference QPs corresponding to the picture frames can be obtained. The obtained weighted average value can be added to the QP offset corresponding to the B0 layer to obtain the coding QP corresponding to the fourth picture frame.

5. Code the fourth picture frame according to the coding QP corresponding to the fourth picture frame.

6. Obtain a bit rate corresponding to the fourth picture frame and a quantization offset parameter corresponding to the B0 layer, calculate a picture complexity parameter corresponding to the fourth picture frame, and update a picture complexity parameter in the bit rate control model by using a picture complexity parameter corresponding to the fourth picture frame.

7. Sequentially obtain the second picture frame, the sixth picture frame, the first picture frame, the third picture frame, the fifth picture frame, and the seventh picture frame for coding. For a coding procedure, refer to the procedure of the steps 2 to 6 of the fourth picture frame, and details are not described herein again.

8. Obtain the last picture frame, that is, a P frame, of a next GOP, and calculate a QP corresponding to the last picture frame of the next GOP according to a bit rate control model and a picture complexity parameter corresponding to the seventh picture frame.

It is noted that, the steps of the embodiments of this application are not necessarily performed according to a sequence indicated by step numbers. Unless otherwise clearly stated in this specification, a sequence of performing these steps is not strictly limited, and the steps may be performed according to another sequence. Furthermore, at least some steps of the embodiments may include a plurality of sub-steps or stages. These sub-steps or stages are not necessarily performed at the same time but may be performed at different time. These sub-steps or stages are not necessarily performed sequentially, but may be performed in turn or alternately with another step or at least a part of sub-steps or stages of the another step.

Figure 9:
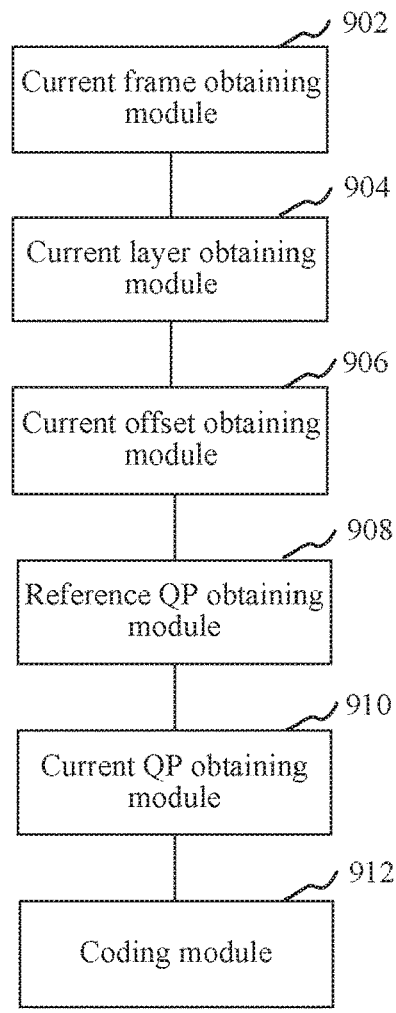
FIG. 9 is a structural block diagram of a video coding apparatus according to an embodiment.

As shown in FIG. 9, in an embodiment, a video coding apparatus is provided. The apparatus may specifically include: a current frame obtaining module 902, configured to obtain a to-be-coded current picture frame; a current layer obtaining module 904, configured to obtain a current layer of the current picture frame in a GOP to which the current picture frame belongs, the GOP including a plurality of picture frames; a current offset obtaining module 906, configured to obtain a current QP offset corresponding to the current picture frame according to the current layer, picture frames on different layers of the GOP corresponding to different QP offsets; a reference QP obtaining module 908, configured to obtain a reference QP corresponding to a reference picture frame of the current picture frame; a current QP obtaining module 910, configured to obtain a current QP corresponding to the current picture frame according to the reference QP and the current QP offset; and a coding module 912, configured to code the current picture frame according to the current QP.

Figure 10:
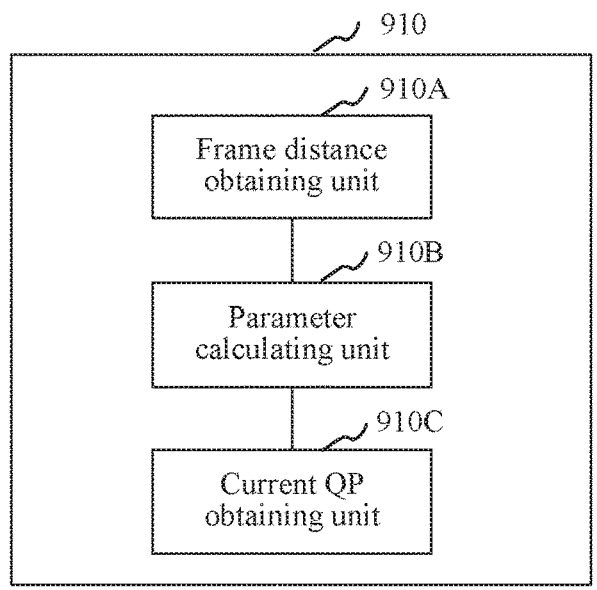
FIG. 10 is a structural block diagram of a current QP obtaining module according to an embodiment.

As shown in FIG. 10, in an embodiment, there is a plurality of reference picture frames. The current QP obtaining module 910 includes:

a frame distance obtaining unit 910A, configured to obtain a frame distance between each of the reference picture frames and the current picture frame;

a parameter calculating unit 910B, configured to calculate a first QP corresponding to the current picture frame according to the frame distances between the reference picture frames and the current picture frame and reference QPs corresponding to the reference picture frames; and a current QP obtaining unit 910C, configured to obtain the current QP corresponding to the current picture frame according to the first QP corresponding to the current picture frame and the current QP offset.

In an embodiment, the parameter calculating unit 910B is configured to: obtain a weight corresponding to a current reference picture frame according to a frame distance between the current reference picture frame and the current picture frame, the frame distance having a negative correlation with the weight; and obtain the first QP corresponding to the current picture frame according to the weights and the reference QPs corresponding to the reference picture frames.

Figure 11:
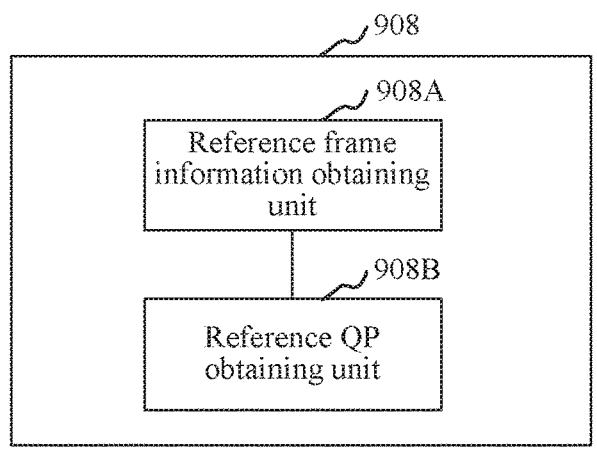
FIG. 11 is a structural block diagram of a reference QP obtaining module according to an embodiment.

As shown in FIG. 11, in an embodiment, the reference QP obtaining module 908 includes:

a reference frame information obtaining unit 908A, configured to obtain a reference frame type of the reference picture frame and a coding QP of the reference picture frame; and a reference QP obtaining unit 908B, configured to obtain the reference QP corresponding to the reference picture frame according to the reference frame type and the coding QP.

In an embodiment, the current picture frame is a bidirectionally predicted frame, and the reference QP obtaining unit 908B is configured to: when the reference frame type is a bidirectionally predicted frame, obtain a layer of the reference picture frame in a GOP to which the reference picture frame belongs; obtain a reference QP offset corresponding to the reference picture frame according to the layer of the reference picture frame in the GOP to which the reference picture frame belongs; and obtain the reference QP corresponding to the reference picture frame according to the coding QP and the reference QP offset corresponding to the reference picture frame.

Figure 12:
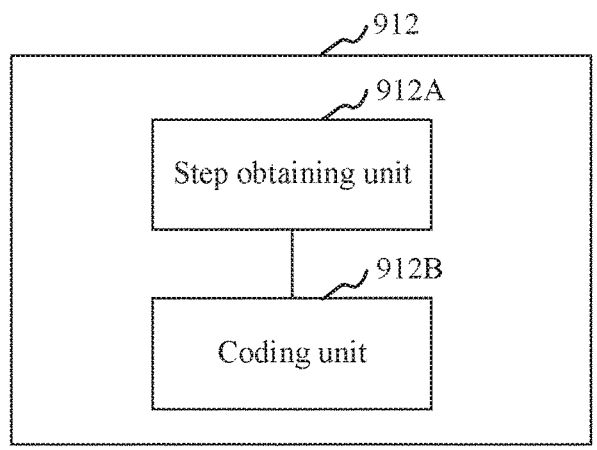
FIG. 12 is a structural block diagram of a coding module according to an embodiment.

As shown in FIG. 12, in an embodiment, the coding module 912 includes:

a step obtaining unit 912A, configured to obtain a current quantization step corresponding to the current picture frame according to the current QP; and a coding unit 912B, configured to code the current picture frame according to the current quantization step, to obtain a current bit rate corresponding to the current picture frame.

Figure 13:
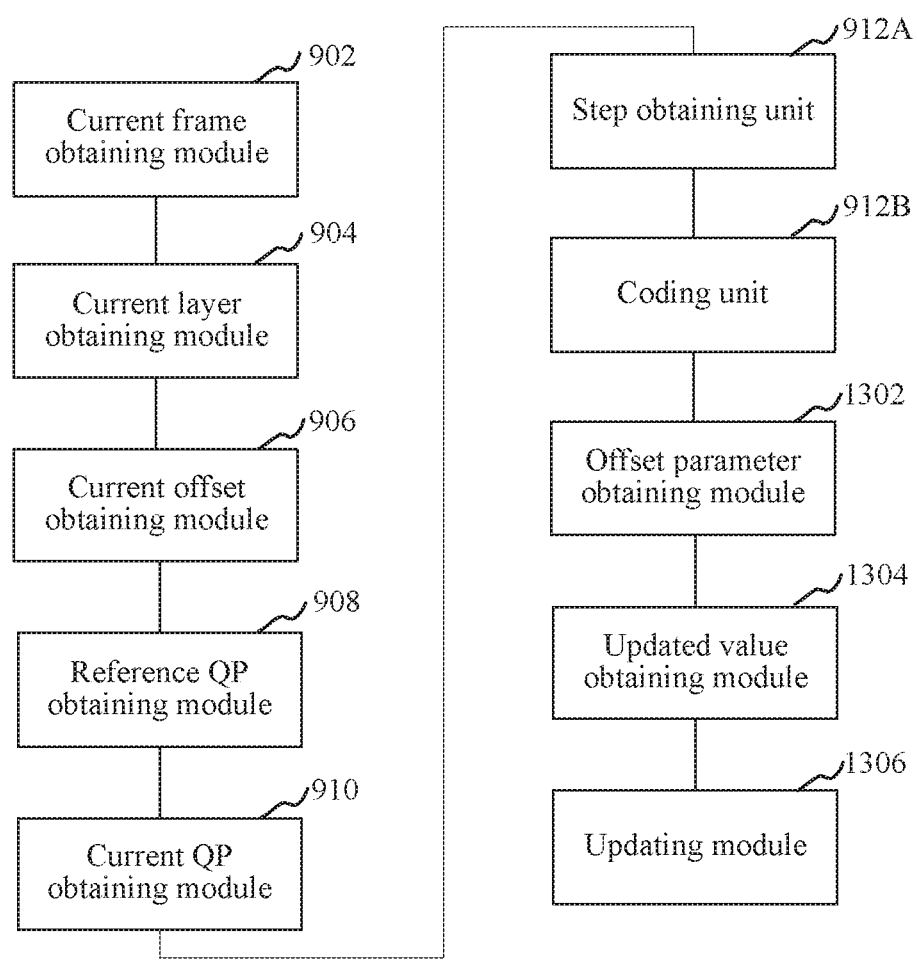
FIG. 13 is a structural block diagram of a video coding apparatus according to an embodiment.

As shown in FIG. 13, in an embodiment, the current picture frame is a bidirectionally predicted frame, and the apparatus further includes:

an offset parameter obtaining module 1302, configured to obtain a preset quantization offset parameter between the picture frame on the current layer and a unidirectional predicted frame.

an updated value obtaining module 1304, configured to obtain a corresponding complexity update value according to the current bit rate corresponding to the current picture frame and the quantization offset parameter; and an updating module 1306, configured to obtain an updated picture complexity parameter according to a picture complexity parameter corresponding to a preceding picture frame of the current picture frame and the complexity update value.

Figure 14:
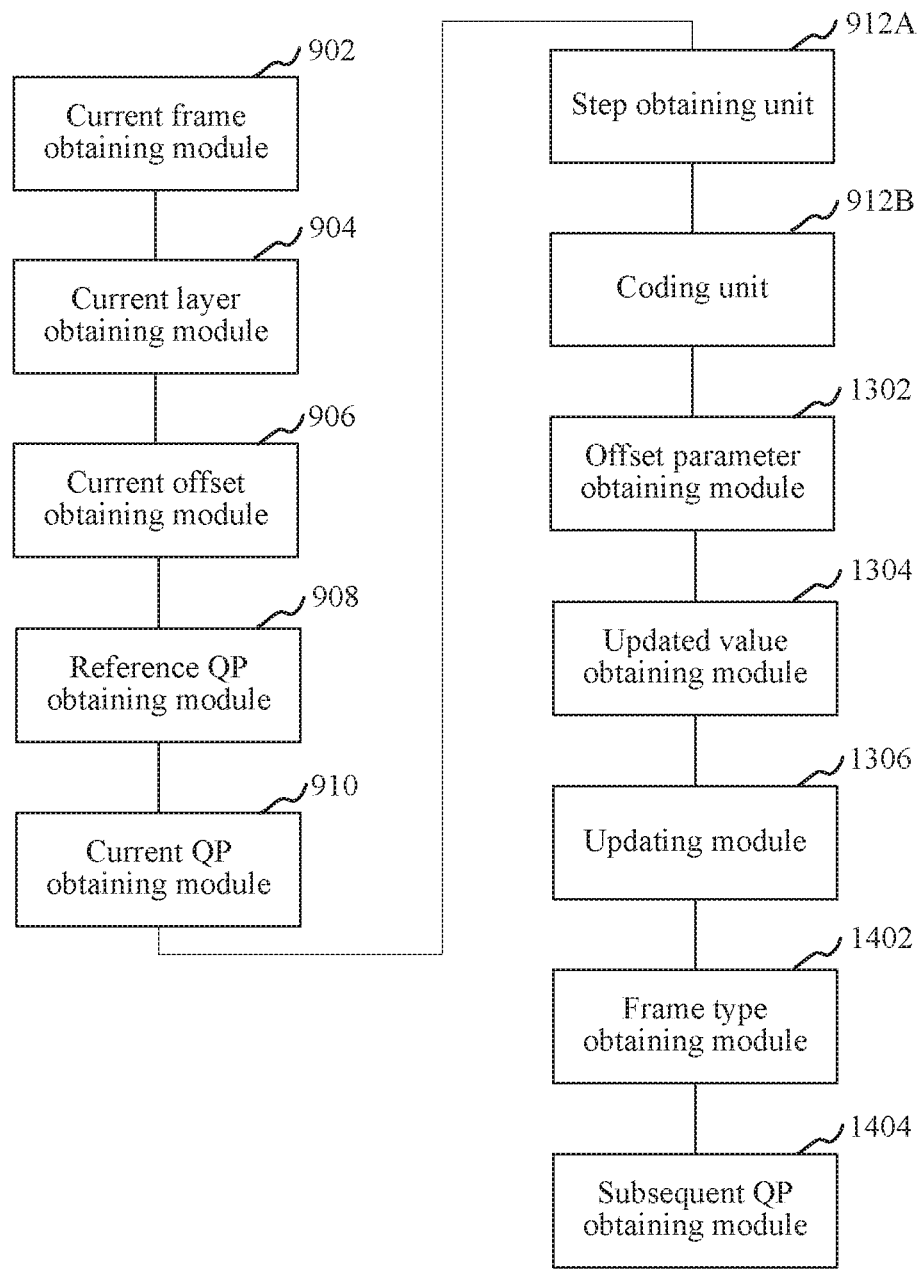
FIG. 14 is a structural block diagram of a video coding apparatus according to an embodiment.

As shown in FIG. 14, in an embodiment, the apparatus further includes:

a frame type obtaining module 1402, configured to obtain a frame type corresponding to a subsequent picture frame that is coded after the current picture frame and that corresponds to the current picture frame; and a subsequent QP obtaining module 1404, configured to: when the subsequent picture frame is a non-bidirectionally predicted frame, obtain a QP corresponding to the subsequent picture frame according to a preset bit rate control model and the updated picture complexity parameter.

Figure 15:
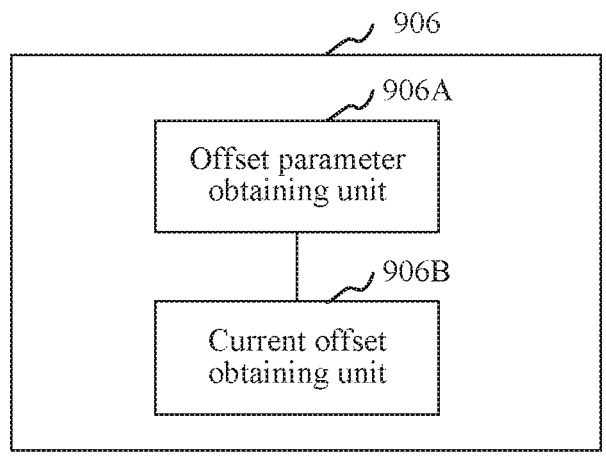
FIG. 15 is a structural block diagram of a current offset obtaining module according to an embodiment.

As shown in FIG. 15, in an embodiment, the current offset obtaining module 906 includes:

an offset parameter obtaining unit 906A, configured to obtain a preset quantization offset parameter between the picture frame on the current layer and a unidirectional predicted frame; and a current offset obtaining unit 906B, configured to obtain the current QP offset corresponding to the current picture frame according to the quantization offset parameter.

Figure 16:
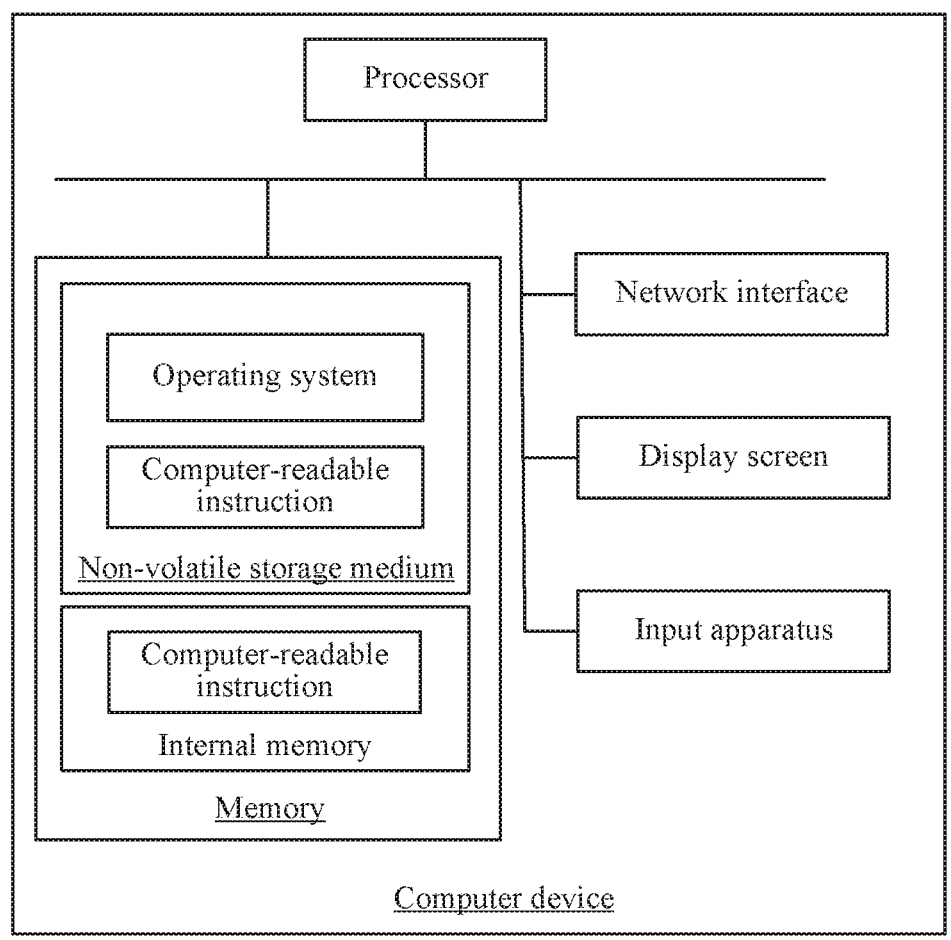
FIG. 16 is a block diagram of an internal structure of a computer device according to an embodiment.

FIG. 16 is a diagram of a structure of a computer device according to an embodiment. The computer device may correspond to the terminal 110 in FIG. 1B. As shown in FIG. 16, the computer device includes processing circuitry such as a processor, a memory, a network interface, an input apparatus and a display screen that are connected by using a system bus. The processing circuitry may be configured to implement one or more of the units/modules described above. The memory includes non-transitory media such as a non-volatile storage medium and an internal memory. The non-volatile storage medium of the computer device stores an operating system, and may further store computer-readable instructions. The computer-readable instructions, when executed by the processor, may cause the processor to implement a video coding method. The internal memory may also store computer-readable instructions. The computer-readable instructions, when executed by the processor, may cause the processor to implement a video coding method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse or the like.

Figure 17:
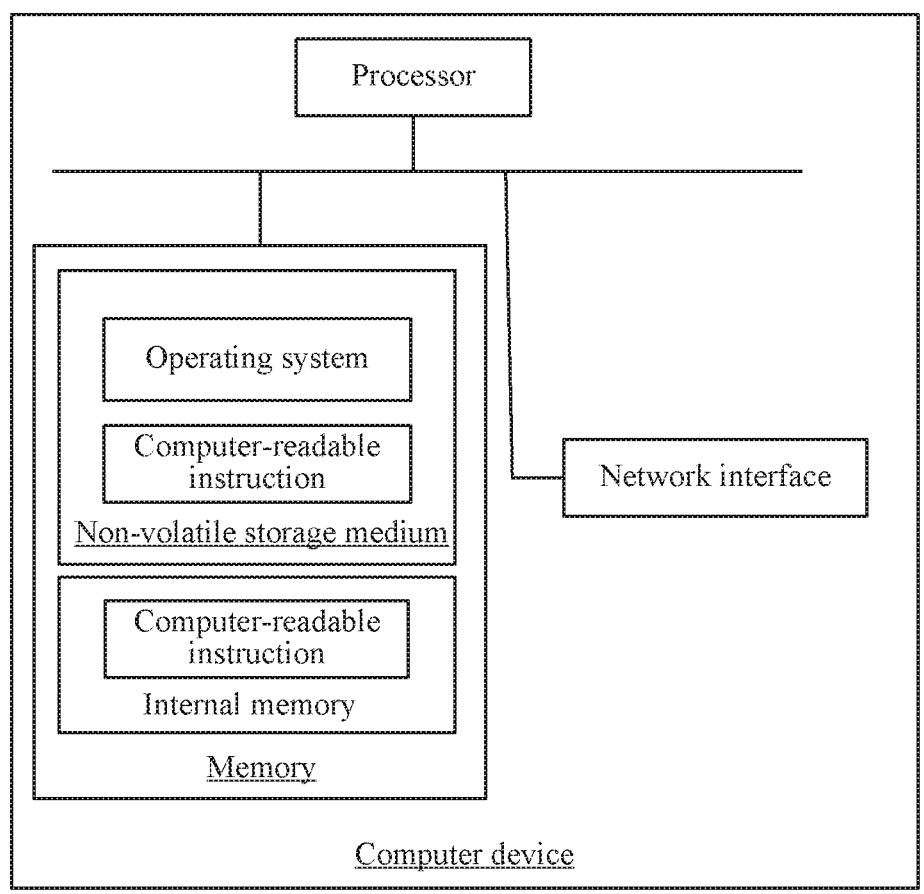
FIG. 17 is a block diagram of an internal structure of a computer device according to an embodiment.

FIG. 17 is a diagram of an internal structure of a computer device according to an embodiment. The computer device may correspond to the server 120 in FIG. 1B. As shown in FIG. 17, the computer device includes processing circuitry such as a processor, a memory, and a network interface that are connected by using a system bus. The processing circuitry may be configured to implement one or more of the units/modules described above. The memory includes non-transitory media such as a non-volatile storage medium and an internal memory. The non-volatile storage medium of the computer device stores an operating system, and may further store computer-readable instructions. The computer-readable instructions, when executed by the processor, may cause the processor to implement a video coding method. The internal memory may also store computer-readable instructions. The computer-readable instructions, when executed by the processor, may cause the processor to implement a video coding method.

A person skilled in the art may understand that the structure shown in FIG. 16 and FIG. 17 is a block diagram of a partial structure related to a solution in this application, and FIG. 16 and FIG. 17 do not constitute a limitation to the computer device to which the solution in this application is applied. Specifically, the computer device may include more or fewer components than those shown in FIG. 16 and FIG. 17, or some components may be combined, or a different component deployment may be used.

In an embodiment, the video coding apparatus provided in this application may be implemented in a form of a computer-readable instruction. The computer-readable instruction may run on the computer device shown in FIG. 16 and FIG. 17. The memory in the computer device may store various program modules in the video coding apparatus such as the current frame obtaining module 902, the current layer obtaining module 904, the current offset obtaining module 906, the reference QP obtaining module 908, the current QP obtaining module 910, and the coding module 912 shown in FIG. 9. The computer-readable instruction formed by the various program modules causes the processor to perform the steps of the video coding method described in the embodiments of this application in this specification.

For example, the computer device shown in FIG. 16 and FIG. 17 may obtain a to-be-coded current picture frame by using the current frame obtaining module 902 in the video coding apparatus shown in FIG. 9; obtain a current layer of the current picture frame in a GOP to which the current picture frame belongs by using the current layer obtaining module 904, the GOP including a plurality of picture frames; obtain a current QP offset corresponding to the current picture frame according to the current layer by using the current offset obtaining module 906; obtain a reference QP corresponding to a reference picture frame of the current picture frame by using the reference QP obtaining module 908; obtain a current QP corresponding to the current picture frame according to the reference QP and the current QP offset by using the current QP obtaining module 910; and code the current picture frame according to the current QP by using the coding module 912.

A person of ordinary skill in the art may understand that all or some of the procedures of the methods in the foregoing embodiments may be implemented by a computer-readable instruction instructing relevant hardware. The program may be stored in a non-volatile computer-readable storage medium. When the program runs, the procedures of the foregoing method embodiments are performed. Any use of a memory, a database or another medium in the embodiments of this application may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. For description instead of limitation, the RAM may be in a plurality of forms such as a static RAM (SRAM), a dynamic RAM (DRAM), a synchronous DRAM (SDRAM), a dual data rate SDRAM (DDRSDRAM), an enhanced SDRAM (ESDRAM), a synchronization link (Synchlink) DRAM (SLDRAM), a Rambus (Rambus) direct RAM (RDRAM), a direct Rambus dynamic RAM (DRDRAM), and a Rambus dynamic RAM (RDRAM).

Technical features of the foregoing embodiments may be combined in various ways. To make description concise, not all possible combinations of the technical features in the foregoing embodiments are described. However, the combinations of these technical features shall be considered as falling within the scope recorded by this specification provided that no conflict exists.

The foregoing embodiments show several implementations of this application and are described in detail, but they should not be construed as a limit to the patent scope of this application. It is noted that a person of ordinary skill in the art may make various changes and improvements without departing from the ideas of this application, which shall all fall within the protection scope of this application.

What is claimed is:

1. A video coding method, comprising:
   receiving, by processing circuitry of a coding device, a current picture in a group of pictures (GOP) of a layered coding structure in a video sequence, the current picture having two reference pictures of a first reference picture and a second reference picture;
   determining, by the processing circuitry, a current layer of the current picture in the layered coding structure;
   determining, by the processing circuitry, a current quantization parameter (QP) offset of the current picture according to the current layer of the current picture;
   determining, by the processing circuitry, reference QPs corresponding to the two reference pictures of the current picture, the reference QP of the first reference picture of the two reference pictures being a QP of the first reference picture minus a reference QP offset corresponding to the first reference picture and being determined according to a layer of the first reference picture in the GOP based on the first reference picture being a B frame;
   determining, by the processing circuitry, a QP based on the reference QPs corresponding to the two reference pictures, a first distance between the first reference picture and the current picture, and a second distance between the second reference picture and the current picture;
   determining, by the processing circuitry, a current QP of the current picture to be a sum of the QP that is determined based on the reference QPs corresponding to the two reference pictures and the current QP offset; and
   coding the current picture according to the current QP.

2. The method according to claim 1, wherein the determining the QP comprises:
   determining the first distance between the first reference picture of the two reference pictures and the current picture, and the second distance between the second reference picture of the two reference pictures and the current picture.

3. The method according to claim 2, wherein the determining the QP based on the first and second distances comprises:
   determining the QP based on a weighted sum of the reference QPs of the two reference pictures based on a first weight and a second weight,
   wherein the first weight corresponds to the first reference picture, and is a first ratio of the second distance to a sum of the first and second distances, and
   the second weight corresponds to the second reference picture, and is a second ratio of the first distance to the sum of the first and second distances.

4. The method according to claim 1, wherein the two reference pictures are I frames, and the determining the QP comprises:
   determining an average of the reference QPs of the two reference pictures; and
   determining the QP that is a sum of the average and a predetermined value.

5. The method according to claim 1, wherein the first reference picture of the two reference pictures is an I frame, and the second reference picture of the two reference pictures is a P frame or B frame, and the determining the QP comprises:
   determining the QP to be a QP of the second reference picture.

6. The method according to claim 1, wherein the determining the reference QPs comprises:
   determining a type and the QP of the first reference picture of the two reference pictures, the type being one of an I frame, P frame, and B frame; and
   determining the reference QP of the first reference picture according to the type and the QP of the first reference picture.

7. The method according to claim 6, wherein the determining the reference QP of the first reference picture comprises:
   when the type of the first reference picture is the B frame,
      determining the layer of the first reference picture in the layer coding structure;
      determining the reference QP offset corresponding to the first reference picture according to the layer of the first reference picture; and
      determining the reference QP of the first reference picture based on a difference between the QP of the first reference picture and the reference QP offset of the first reference picture.

8. The method according to claim 6, wherein the determining the reference QP of the first reference picture comprises:
   when the type of the first reference picture is I frame or P frame,
      determining the QP of the first reference picture to be the reference QP of the first reference picture.

9. The method according to claim 1, wherein the coding the current picture comprises:
   determining a current quantization step corresponding to the current picture according to the current QP; and
   coding the current picture according to the current quantization step to obtain a current bit rate corresponding to the current picture.

10. The method according to claim 9, further comprising:
    determining a quantization offset parameter of the current layer of the current picture with respect to a unidirectionally predicted picture in the GOP;

determining a complexity update value according to the current bit rate of the current picture and the quantization offset parameter; and determining an updated picture complexity parameter according to a picture complexity parameter of a preceding picture frame of the current picture and the complexity update value.

11. The method according to claim 10, further comprising:

determining a type of a subsequent picture that is coded after the current picture; and when the subsequent picture is a non-bidirectionally predicted picture, determining a QP corresponding to the subsequent picture according to a bit rate control model and the updated picture complexity parameter.

12. The method according to claim 1, wherein the determining the current QP offset comprises:

determining a quantization offset parameter of the current layer with respect to a unidirectionally predicted picture in the GOP; and determining the current QP offset according to the quantization offset parameter.

13. The method according to claim 12, wherein a first layer in the layered coding structure that is higher than a second layer in the layered coding structure has a higher quantization offset parameter.

14. An apparatus of video coding, comprising circuitry configured to:

receive a current picture in a group of pictures (GOP) of a layered coding structure in a video sequence, the current picture having two reference pictures of a first reference picture and a second reference picture;

determine a current layer of the current picture in the layered coding structure;

determine a current quantization parameter (QP) offset of the current picture according to the current layer of the current picture;

determine reference QPs corresponding to the two reference pictures of the current picture, the reference QP of the first reference picture of the two reference pictures being a QP of the first reference picture minus a reference QP offset corresponding to the first reference picture and being determined according to a layer of the first reference picture in the GOP based on the first reference picture being a B frame;

determine a QP based on the reference QPs corresponding to the two reference pictures, a first distance between the first reference picture and the current picture, and a second distance between the second reference picture and the current picture;

determine a current QP of the current picture to be a sum of the QP that is determined based on the reference QPs corresponding to the two reference pictures and the current QP offset; and coding the current picture according to the current QP.

15. A non-transitory computer-readable medium storing a program executable by a processor to perform a method, the method comprising:

receiving a current picture in a group of pictures (GOP) of a layered coding structure in a video sequence, the current picture having two reference pictures of a first reference picture and a second reference picture;

determining a current layer of the current picture in the layered coding structure;

determining a current quantization parameter (QP) offset of the current picture according to the current layer of the current picture;

determining reference QPs corresponding to the two reference pictures of the current picture, the reference QP of the first reference picture of the two reference pictures being a QP of the first reference picture minus a reference QP offset corresponding to the first reference picture and being determined according to a layer of the first reference picture in the GOP based on the first reference picture being a B frame;

determining a QP based on the reference QPs corresponding to the two reference pictures, a first distance between the first reference picture and the current picture, and a second distance between the second reference picture and the current picture;

determining a current QP of the current picture to be a sum of the QP that is determined based on the reference QPs corresponding to the two reference pictures and the current QP offset; and coding the current picture according to the current QP.

16. The non-transitory computer-readable medium according to claim 15, wherein the determining the QP comprises:

determining the first distance between the first reference picture of the two reference pictures and the current picture, and the second distance between the second reference picture of the two reference pictures and the current picture.

17. The non-transitory computer-readable medium according to claim 16, wherein the determining the QP comprises:

determining the QP based on a weighted sum of the reference QPs of the two reference pictures based on a first weight and a second weight, wherein the first weight corresponds to the first reference picture, and is a first ratio of the second distance to a sum of the first and second distances, and the second weight corresponds to the second reference picture, and is a second ratio of the first distance to the sum of the first and second distances.

18. The non-transitory computer-readable medium according to claim 15, wherein the two reference pictures are I frames, and the determining the QP comprises:

determining an average of the reference QPs of the two reference pictures; and determining the QP that is a sum of the average and a predetermined value.

19. The non-transitory computer-readable medium according to claim 15, wherein the first reference picture of the two reference pictures is an I frame, and the second reference picture of the two reference pictures is a P frame or B frame, and the determining the QP comprises:

determining the QP to be a QP of the second reference picture.

20. The non-transitory computer-readable medium according to claim 15, wherein the determining the reference QPs comprises:

determining a type and the QP of the first reference picture of the two reference pictures, the type being one of an I frame, P frame, and B frame; and determining the reference QP of the first reference picture according to the type and the QP of the first reference picture.

* * * * *